United States Patent [19]
Dietrich

[11] Patent Number: 5,947,565
[45] Date of Patent: Sep. 7, 1999

[54] TENSIONED SPOKED BICYCLE WHEEL ASSEMBLY AND HUB THEREFOR

[76] Inventor: Rolf Dietrich, 4631 Shadowood, Toledo, Ohio 43614

[21] Appl. No.: 08/931,298

[22] Filed: Sep. 16, 1997

Related U.S. Application Data

[63] Continuation-in-part of application No. 08/921,885, Aug. 25, 1997.

[51] Int. Cl.$^6$ ........................................................ B60B 1/14
[52] U.S. Cl. .......................................... 301/59; 301/110.5
[58] Field of Search .................................. 301/55, 56, 59, 301/110.5

[56] References Cited

U.S. PATENT DOCUMENTS

| | | | |
|---|---|---|---|
| 478,394 | 7/1892 | Bretz | 301/56 |
| 605,208 | 6/1898 | Skarin | 301/56 X |
| 1,388,021 | 8/1921 | Budd | 301/59 |
| 4,090,737 | 5/1978 | Jensen | 301/59 X |
| 4,300,804 | 11/1981 | Hasebe . | |
| 5,228,756 | 7/1993 | Krampera . | |
| 5,626,401 | 5/1997 | Terry, Sr. et al. | 301/59 |

FOREIGN PATENT DOCUMENTS

| 479141 | 2/1916 | France | 301/59 |
|---|---|---|---|

Primary Examiner—Russell D. Stormer
Attorney, Agent, or Firm—David C. Purdue; John C. Purdue

[57] ABSTRACT

An improved bicycle wheel is disclosed which has reduced dish by comparison with a conventionally laced wheel. The wheel is one which, when laced conventionally, would be dished such as a rear wheel with at least one sprocket or a front wheel with a brake disk. In a rear wheel embodiment, the spokes extend from inside to outside, through a proximate hub flange and along the outside or sprocket surface of the proximate hub flange and from outside to inside through the opposed hub flange and along the inside or sprocket surface of the opposed hub flange. In a front wheel embodiment, the spokes extend from inside to outside through the proximate hub flange along an inside or disk surface thereof and from outside to inside through the opposite hub flange and along the inside or disk surface thereof. The spokes in a given flange of a hub according to the present invention are all secured to the hub flange at substantially the same axial location relative to the axis of rotation of the hub or have spoke elbows which are all at substantially the same axial location relative to the axis of rotation of the hub. As a consequence of the reduced dish there is a reduction in the tension differential between the proximate spokes and the opposed spokes. According to another aspect of the invention, spoke bores in each of the hub flanges are grouped into pairs and the circumferential distance between adjacent pairs is greater than the distance between bores in a given pair.

9 Claims, 3 Drawing Sheets

TENSIONED SPOKED BICYCLE WHEEL ASSEMBLY AND HUB THEREFOR

REFERENCE TO THE RELATED APPLICATION

This is a continuation-in-part of patent application Ser. No. 08/921,885 filed Aug. 25, 1997.

BACKGROUND OF THE INVENTION

1. Field of the Invention.

The present invention relates generally to bicycle wheels and bicycle wheel hubs. More specifically, the invention relates to rear, tangentially laced, tensioned spoke bicycle wheels comprising a hub, a rim, at least one sprocket, a first, proximate set of spokes and a proximate hub flange, adjacent to the at least one sprocket, and a second, opposed set of spokes and an opposed hub flange opposite the at least one sprocket wherein said spokes are paired at the hub flanges or wherein said proximate spokes extend towards the rim adjacent to an outside surface or sprocket side of the proximate hub flange and the opposed spokes extend towards the rim adjacent to an inside surface or sprocket side of the opposed hub flange, or both. The invention is also concerned with such a tangentially laced, tensioned bicycle wheel which includes a disk, in place of the at least one sprocket, as in a front wheel used on a bicycle equipped with a disk brake.

2. Description of the Prior Art

Bicycle wheels are certainly known as are multi-speed bicycles with rear wheel hubs including a multiplicity of sprockets. In a conventional rear bicycle wheel with one or more sprockets, as well as a front wheel equipped with a disk, the wheel is "dished" meaning that a plane perpendicular to the axis of rotation of the wheel and mid-way between the flanges of the hub will be spaced from a plane perpendicular to the axis of rotation of the wheel and coinciding with the center plane of the rim. Reference is made to U.S. Pat. No. 5,228,756 ("Krampera"), the disclosure of which is incorporated herein by reference. In column one of this patent, there is a discussion of wheel dish.

The axle of a rear bicycle wheel is mounted in "drop-outs" in a bicycle frame. The rear wheel hub and at least one sprocket are mounted on the axle. The hub includes a hub flange adjacent to the sprockets, herein referred to as the proximal hub flange and a hub flange opposite the proximal hub flange, hereinafter referred to as the opposite hub flange. In a conventional dished wheel, the spokes which are attached to the proximal hub flange are under more tension than the spokes which are attached to the opposite hub flange. This has lead some inventors to connect the spokes to the rim at points which do not coincide with the center plane of the rim, reducing or even eliminating dish. This approach is illustrated and discussed in the Krampera patent. In dished wheels, the proximate spokes are at a higher tension than the opposite spokes.

Rear wheels and front wheels with disk brakes are tangentially laced so that, between the hub flange and the rim, the spokes will cross at least one or two and usually three other spokes, depending on the number of spokes and the lacing geometry. In conventional wheels, there is contact between the spokes where they cross and this can lead to problems ranging from noise to spoke failure. This contact and several approaches to eliminating such contact are discussed in U.S. Pat. No. 4,300,804 ("Hasebe"), the disclosure of which is incorporated herein by reference. This patent discloses various ways to mount the spokes at each of the two hub flanges, at two different axial locations but on the same side of the hub flange, thereby eliminating or reducing spoke interference. The Hasebe patent also includes an informative discussion in column one concerning the orientation of the spoke heads at the hub flange. In what it calls alternate assembly, spokes adjacent to each other on a given flange are inserted into spoke bores in the hub flanges from opposite sides of the hub flange. In this conventional design, interference between spokes at cross-over points is reduced by comparison with the case where all of the spokes are inserted through spoke bores from the same side of the hub flange. The Hasebe patent discloses modified hub flanges which reduce spoke interference when all of the spokes in a particular hub flange are inserted through the spoke bores from the same side of the hub flange. The patent teaches that all of the spokes are inserted through spoke bores from the "axially inside side" (column 2, line 23). As a consequence, in the Hasebe wheel, spoke interference is reduced, but the dish of the wheel remains the same.

SUMMARY OF THE INVENTION

The present invention is based upon the discovery of an improved, tangentially laced wheel which has so-called one-sided spoking but has reduced dish and, therefor, reduced tension differential between the proximate and the opposite spokes, by comparison with a conventional, tangentially laced wheel or a wheel tangentially laced according to the disclosure of the Hasebe patent. According to the invention, the spokes extend from inside to outside, through the proximate hub flange and along the outside surface of the proximate hub flange and from outside to inside through the opposed hub flange and along the inside surface of the opposed hub flange. Unlike the spokes in the Hasebe wheel, however, the spokes in a given flange of a hub according to the present invention are all secured to the hub flanges at substantially the same axial location relative to the axis of rotation of the hub or have spoke elbows which are all at substantially the same axial location relative to the axis of rotation of the hub. As a consequence, the dish of the wheel is reduced, thereby reducing the tension differential between the proximate spokes and the opposed spokes. According to another aspect of the invention, spoke bores in each of the hub flanges are grouped into pairs and the distance between adjacent pairs is greater than the distance between bores in a given pair. Spokes secured in spoke bores of a given pair diverge from each other and each crosses at least one spoke secured in an adjacent pair of spoke bores. However, the spokes cross at a point which is further from the axis of rotation of the wheel than it would be if the spoke bores were evenly spaced on the hub flanges. As a consequence, there is reduced spoke bending at cross-over points and reduced spoke stresses at the cross-over points and this can be reduced even further in the case where the wheel has bladed or aero type spokes. In addition, this spoke bore pairing is preferably combined with a spoke orientation which is nearly tangential, relative to the hub flanges, for increased torque transmission. In yet another aspect, the invention is concerned with a front, tangentially laced wheel, including a brake disk, with reduced dish and reduce tension differential between the proximate spokes and the opposite spokes.

Accordingly, it is an object of the present invention to provide a rear wheel including a hub assembly in which spokes are carried and oriented in the proximate and the opposed hub flanges so that the wheel has reduced dish by comparison with the same wheel laced in a conventional manner.

It is another object of this invention to provide a tangentially laced wheel with reduced tension differential as between the proximate spokes and the opposite spokes.

It is a further object of the present invention to provide a wheel hub with spoke bores that are grouped into pairs on the hub flanges so that cross-over points for the spokes are further from the wheel axis of rotation than they are in a wheel with evenly spaced spoke bores.

It is yet another object of the present invention to provide a rear bicycle wheel with reduced bending and spoke stresses at spoke cross-over points.

It is a further object of the present invention to provide a rear hub with spokes that are oriented nearly tangentially, relative to the hub flange.

It is another object of this invention to provide a front, tangentially laced wheel including a disk and having reduced dish and reduced tension differential as between the proximate spokes and the opposite spokes.

These and other objects and advantages of the present invention will no doubt become apparent to those skilled in the art after having read this detailed description of the invention including the following description of the preferred embodiment which is illustrated by the various figures of the drawing.

DETAILED DESCRIPTION OF THE PREFERRED EMBODIMENTS

Figure 1:
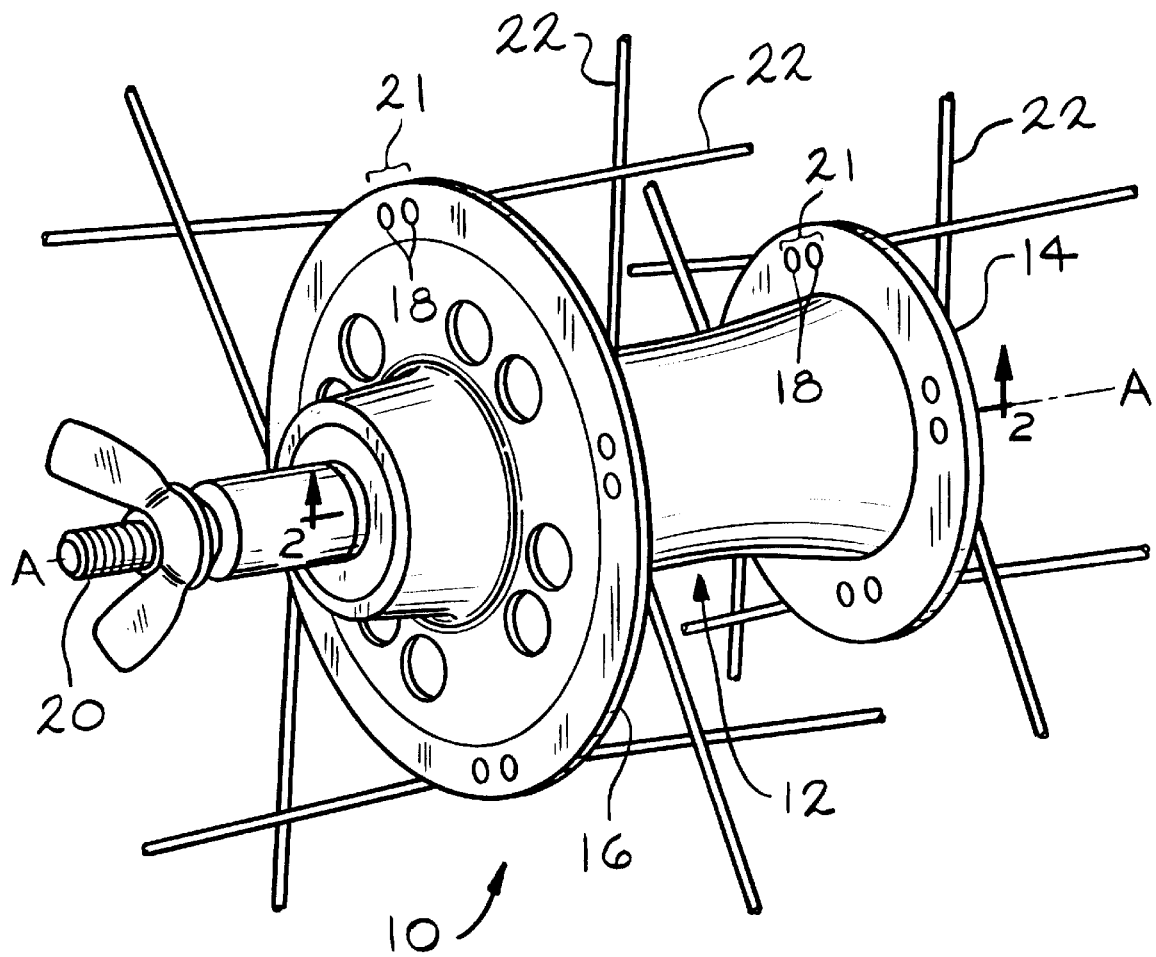
FIG. 1 is a perspective view of a hub assembly according to the present invention.
Figure 2:
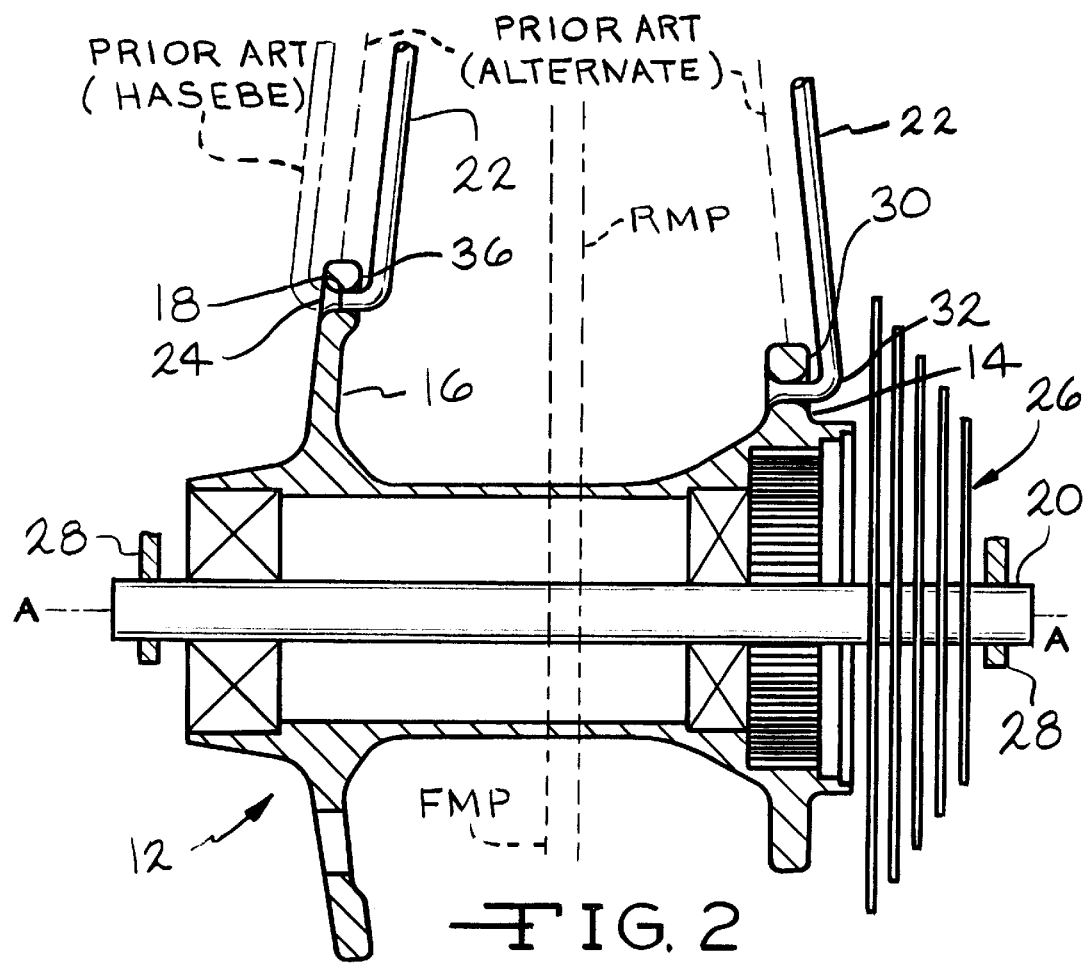
FIG. 2 is a cross sectional view of the hub shown in FIG. 1, taken along the line 2—2 of FIG. 1.
Figure 3:
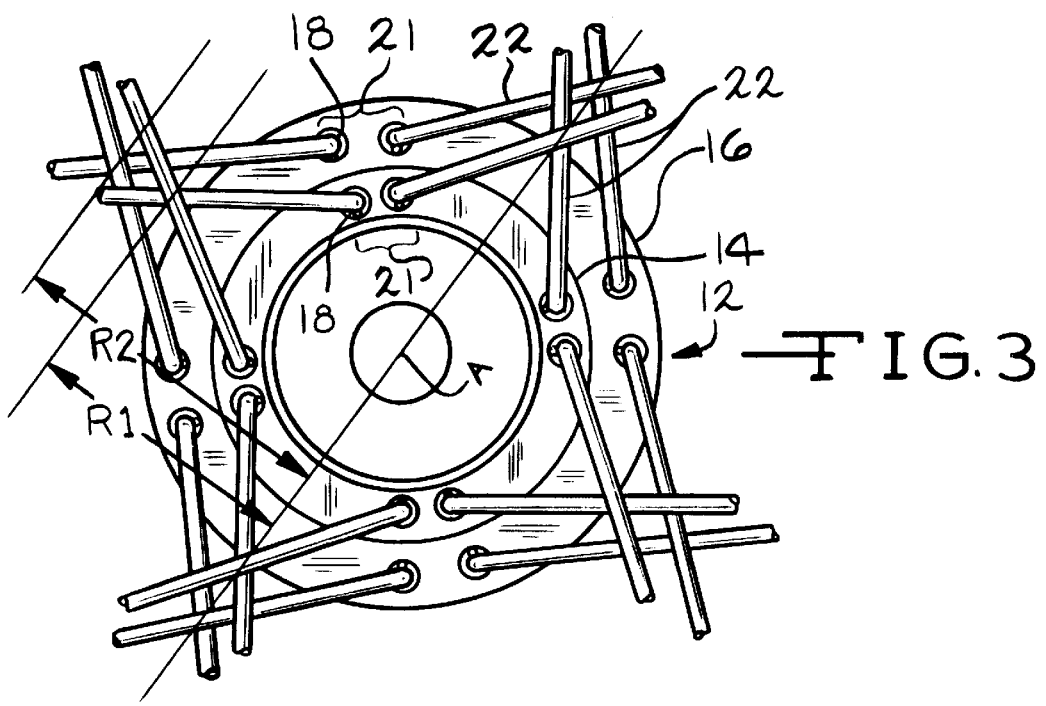
FIG. 3 is a side view of the hub assembly shown in FIGS. 1 and 2.

Referring to FIGS. 1, 2 and 3, the hub assembly of a sixteen spoke rear wheel according to the present invention is indicated generally at 10. The assembly 10 comprises a hub indicated at 12 and including a proximate hub flange 14 and an opposed hub flange 16. The circumference of the opposed hub flange 16 is larger than the circumference of the proximate hub flange 14, in accordance with the disclosure of my co-pending application Ser. No. 08/730,479, the disclosure of which is incorporated herein by reference. However, the present invention is not limited to the case where the opposite hub flange is larger than the proximate hub flange. The present invention is equally well suited for use in a wheel including a hub having equally sized hub flanges or one including a hub having an opposed hub flange which is smaller than the proximate hub flange (not shown).

Each of the hub flanges 14 and 16 have spoke bores, indicated at 18 (see FIG. 2), which extend through the hub flanges and are oriented so that they are generally parallel to the axis of rotation of the hub 12, indicated by the line A—A, when it is mounted on an axle 20 (FIG. 1). The spoke bores 18 are grouped together in pairs, indicated generally at 21 (FIGS. 1 and 3), on the proximate hub flange 14 and also on the opposed hub flange 16. Spokes 22 with heads 24 (FIG. 2) at one end are laced through the spoke bores 18 so that the heads 24 seat in the spoke bores 18. The spokes 22 extend from the hub flanges 14 and 16 and are secured, at their opposite ends (not shown) to a rim (not shown) in a suitable manner. It is preferred that the spoke bores 18 and the spoke bore pairs 21 on the proximate hub flange 14 be oriented so that the corresponding spoke bores 18 and spoke bore pairs 21 on the opposite hub flange 16 are aligned, as shown in FIG. 3. However, other orientations are to be considered within the broad scope of this invention.

The spokes 22 associated with a given pair 21 of spoke bores 18 on a given hub flange do not cross each other but extend away from each other in generally opposite directions, almost parallel to a tangent drawn on the outer edge of the hub flange, at a point mid-way between the spoke bores 18 in the spoke bore pair 21. In the sixteen spoke embodiment illustrated in the drawing, each spoke 22 intersects another spoke 22 once and that is a spoke 22 which is carried in the closest spoke bore 18 in the adjacent spoke bore pair 20. The intersection of a pair of spokes 22 is positioned a given distance from the axis of rotation A. That distance, in the case of spokes 22 carried on the proximate hub flange 14, is indicated by the designation R1 and, in the case of spokes 22 carried on the opposed hub flange 16, is indicated by the designation R2. Depending on the relative sizes of the proximate and the opposed hub flanges, R1 and R2 might be equal or R1 could be greater or less than R2. It will be appreciated, in any event, that R1 and R2, that is, the distances from the axis A to the intersection of adjacent spokes, are greater, respectively, in the illustrated embodiment than they would be in a conventional wheel with a like number of spokes where the spoke bores were evenly spaced around the periphery of the hub flanges. In other words, as a result of the spoke bore pairing and the spoke lacing of the present invention, the crossover points of spokes 22 are further from the axis of rotation than they are in the case where the spoke bores are evenly spaced as they are in conventional hubs or nearly evenly spaced as they are in the hubs disclosed in the Hasebe patent. As a consequence, in a wheel according to the present invention, there is less bending of the spokes 22 at their cross-over points and less spoke stress, as well.

In the case of a twenty spoke wheel (not shown), including a hub with five pairs of spoke bores per hub flange and conventionally sized hub flanges, and laced so that spokes in a pair of spoke bores extend in opposite directions, each spoke will intersect another spoke just once between the hub and the rim.

In the case of a twenty-four spoke wheel (not shown), including a hub with six pairs of spoke bores per hub flange and conventionally sized hub flanges, and laced so that spokes in a pair of spoke bores extend in opposite directions, each spoke will intersect another spoke just twice between the hub and the rim.

In the 16 spoke wheel represented in FIGS. 1 through 3, each spoke bore in a pair is separated from the other one by an arc of about five degrees whereas each spoke bore pair is separated by an arc of approximately 85 degrees. In a wheel according to the present invention, where the hub flange spoke bores in a pair are separated from each other by an arc of X degrees, the spoke bore pairs are separated by an arc which is greater than X degrees. Preferably, the spoke bore pairs are separated by an arc of at least 2X degrees. Further advantages accrue in the case where the spoke bore pairs are separated by an arc of at least 4X degrees. It is preferred that the spoke bore pairs be separated by at least 4X and, even more preferably, at least 8X. The embodiment shown in the drawing, in the context of a sixteen, twenty or twenty-four spoke wheel, is most preferred in that the spoke bores in a given pair are virtually next to each other and the pairs are evenly spaced around the hub flanges. A preferred wheel according to this embodiment of the present invention has no more than twenty-four spokes.

Referring to FIG. 2, the proximate hub flange 14 is adjacent to a sprocket cluster indicated at 26 or a single sprocket (not shown) and is between the sprocket cluster 26 and the opposite hub flange 16. The axle 20, as mentioned above, is secured in dropouts in a bicycle frame, portions of which are indicated at 28 in FIG. 2, and the rim (not shown) has a mid-plane, indicated at RMP, which is perpendicular to the axis of rotation A—A and is midway between the drop-outs. A flange mid-plane, indicated at FMP, is also perpendicular to the axis of rotation and is mid-way between the proximate hub flange 14 and the opposed hub flange 16. As discussed above, a wheel incorporating the hub assembly shown in FIG. 2 would be dished because the rim mid-plane RMP and the flange mid-plane FMP are not coincident. In this case, the rim-mid plane is closer to the proximate hub flange 14 than it is to the opposed hub flange 16. As a consequence, the spokes 22 carried in the proximate hub flange 14 are under higher tension than the spokes carried in the opposed hub flange 16, in order to hold the rim half way between the dropouts 28. This tension differential is reduced in the hub 12, according to the present invention, because all of the proximate spokes carried in the proximate hub flange 14 are laced inside to outside and extend toward the rim from the hub 12 adjacent to or alongside a sprocket surface or side 30 of the proximate hub flange 14, thereby effectively reducing the axial distance between the FMP and the RMP. The sprocket side 30 is substantially planar, though slightly conical, so that each spoke elbow 32 of each proximate spoke 22 carried in the proximate hub flange 14 can be intersected by a single plane which is perpendicular to the axis of rotation of the axle. Similarly, all of the opposed spokes 22 carried in the opposed hub flange 16 are laced outside to inside and extend toward the rim from the hub 12 adjacent to or alongside a sprocket surface or side 36 of the opposed hub flange 16. The sprocket side 36 is substantially planar, though slightly conical, so that each spoke elbow 32 of each opposed spoke 22 carried in the opposed hub flange 16 can be intersected by a plane which is perpendicular to the axis of rotation of the axle.

As a consequence of the proximate spokes and the opposite spokes extending outwardly along the sprocket sides of the proximate and opposite hub flanges 14 and 16, respectively, there is going to be less tension in the proximate spokes 22 than there would be in the case of prior art wheels. One such prior art wheel, as disclosed in U.S. Pat. No. 4,300,804 (Hasebe), has proximate spokes oriented like the proximate spokes 22 shown in FIG. 2 but has opposite spokes oriented like an opposite spoke, labeled "Hasebe", shown in phantom in FIG. 2. That is, the opposite spokes in a wheel according to the disclosure of the Hasebe patent have elbows which are adjacent to the side of the opposite hub flange which is opposite the sprocket side 36 thereof, in the context of the hub 12. The Hasebe patent refers to another type of prior art wheel, namely one having "alternate" spoking patterns in which spokes are inserted into spoke bores alternately from the axially inside and outside of each of the hub flanges, resulting in net forces due to spoke tensions acting through a cone coinciding with the axial middle of each hub flange, as shown by dotted lines labeled "Alternate" in FIG. 2. By comparison, in a wheel including the hub assembly 10, the net forces of the spokes are acting through a section of a cone which is adjacent to and coextensive with the sprocket sides 30 and 36 of the proximate and opposite hub flanges 14 and 16, respectively. This reduces the differences between the tensions in the proximate and opposite spokes, tending to equalize spoke tensions as between the proximate and opposite spokes, thereby reducing the tension differential between these spokes as it exists in the prior art wheels.

Figure 4:
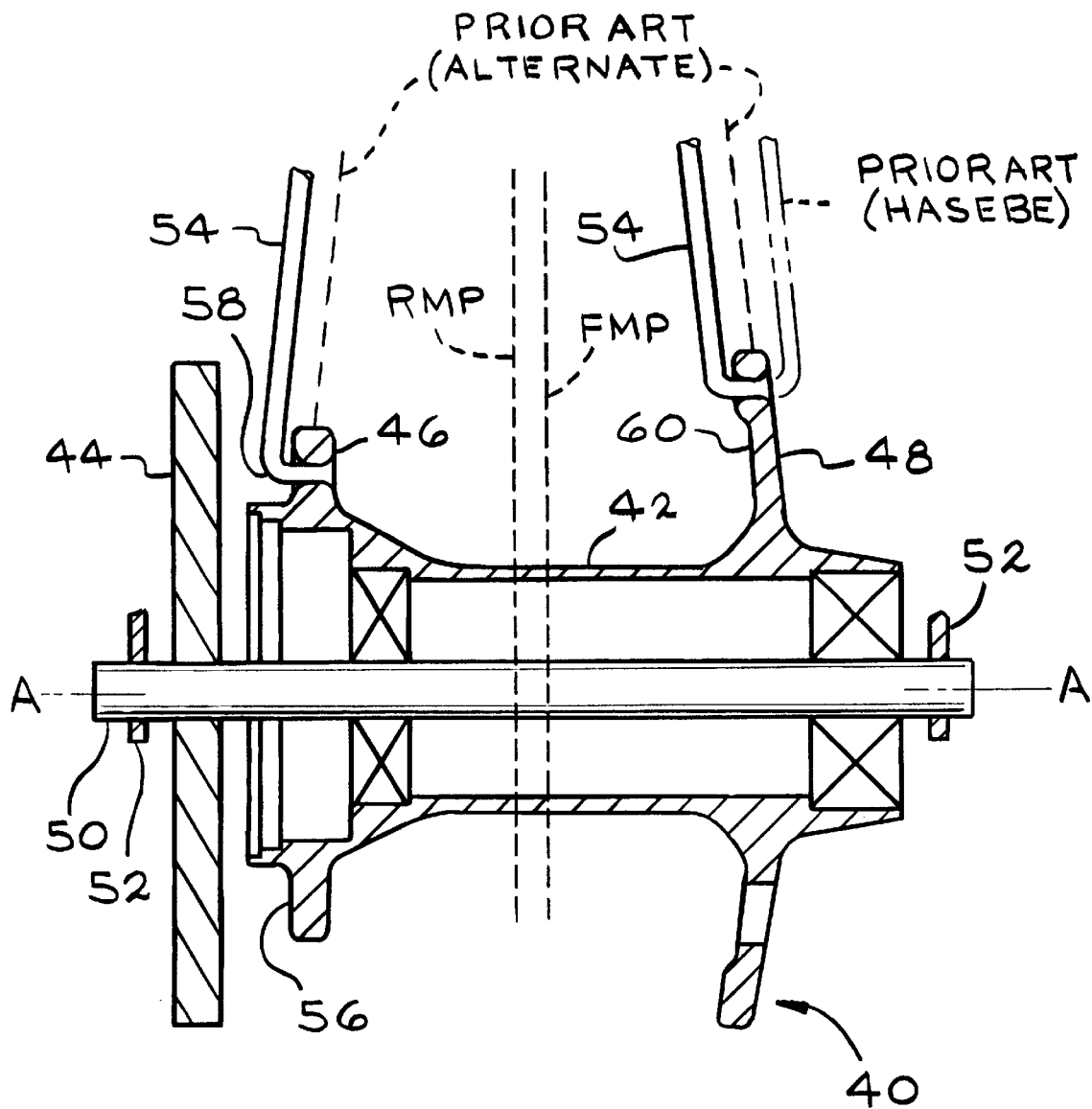
FIG. 4 is a cross sectional view of a front wheel including a disk with spoke lacing according to the present invention.

Referring now to FIG. 4, a front wheel hub assembly according to the present invention is indicated at 40. The hub assembly 40 comprises a hub 42 and a disk 44 secured to the hub 42, adjacent a proximate hub flange 46. An opposite hub flange 48 is provided on the hub 42. The disk 44 and the hub 42 are mounted for rotation about an axle 50 which has a longitudinal axis A—A and is mounted in forks, portions of which are indicated at 52. Spokes 54 are secured in the hub flanges and extend outwardly toward the rim (not shown). All of the proximate spokes 54 carried in the proximate hub flange 46 are laced inside to outside and extend toward the rim from the hub 42 adjacent to or alongside a disk surface or side 56 of the proximate hub flange 46, thereby effectively reducing the axial distance between the FMP and the RMP. The disk side 56 is substantially planar, though slightly conical. Each spoke 54 has an elbow 58 and the elbow 58 of each proximate spoke 54 carried in the proximate hub flange 46 can be intersected by a single plane which is perpendicular to the axis of rotation A—A of the axle 50. Similarly, all of the opposed spokes 54 carried in the opposed hub flange 48 are laced outside to inside and extend toward the rim from the hub 42 adjacent to or alongside a disk surface or side 60 of the opposed hub flange 48. The disk side 60 is substantially planar, though slightly conical, so that each spoke elbow 58 of each opposed spoke 54 carried in the opposed hub flange 48 can be intersected by a plane which is perpendicular to the axis of rotation of the axle 50.

As a consequence of the proximate spokes and the opposite spokes extending outwardly along the disk sides of the proximate and opposite hub flanges 46 and 48, respectively, there is going to be less tension in the proximate spokes 54 than there would be in the case of prior art wheels. In the case of a prior art wheel including a brake disk, modified to have spoke lacing such as that disclosed in U.S. Pat. No. 4,300,804 (Hasebe) the proximate spokes would be oriented like the proximate spokes 54 shown in FIG. 4 but the opposite spokes would be oriented like an opposite spoke, labeled "Hasebe", shown in phantom in FIG. 4. That is, the opposite spokes in a wheel including a brake disk and having spokes laced according to the disclosure of the Hasebe patent would have elbows which are adjacent to the side of the opposite hub flange which is opposite the disk side 60 thereof, in the context of the hub 42. The Hasebe patent refers to another type of prior art wheel, namely one having "alternate" spoking patterns in which spokes are inserted into spoke bores alternately from the axially inside and outside of each of the hub flanges, resulting in net forces due to spoke tensions acting through a cone coinciding with the axial middle of each hub flange, as shown by dotted lines labeled "Alternate" in FIG. 4. By comparison, in a wheel including the hub assembly 40, the net forces of the spokes are acting through a cone which is adjacent to the disk sides 56 and 60 of the proximate and opposite hub flanges 46 and 48, respectively. This reduces the differences between the tensions in the proximate and opposite spokes, tending to equalize spoke tensions as between the proximate and opposite spokes, thereby reducing the tension differential between these spokes as it exists in the prior art wheels.

It will be appreciated that the invention, described above with reference to specific embodiments, is susceptible of being adapted to other constructions of wheels and hubs. The foregoing description is intended to enable one skilled in the art to practice the invention and to make such adaptations, without limiting the scope of the invention.

I claim:

1. A hub for a rear tensioned spoked bicycle wheel having twenty four spokes or less, said hub comprising a proximate hub flange and an opposed hub flange, each of said flanges having at least six spoke bores extending therethrough, wherein the spoke bores in at least one of said flanges are grouped into at least three pairs, wherein each spoke bore in a given pair is spaced from the other spoke bore in said pair by an arc of X degrees or less and wherein each spoke bore pair is separated from an adjacent spoke bore pair by an arc which is greater than 8X degrees.

2. The hub claimed in claim 1 wherein each spoke bore pair is separated from an adjacent spoke bore pair by an arc which is greater than 2X degrees.

3. The hub claimed in claim 1 wherein each spoke bore pair is separated from an adjacent spoke bore pair by an arc which is greater than 4X degrees.

4. A hub for a rear tensioned spoked bicycle wheel having twenty spokes or less, said hub comprising a proximate hub flange and an opposed hub flange, each of said flanges having at least six spoke bores extending therethrough, wherein the spoke bores in at least one of said flanges are grouped into at least three pairs, wherein each spoke bore in a given pair is spaced from the other spoke bore in said pair by an arc of X degrees or less and wherein each spoke bore pair is separated from an adjacent spoke bore pair by an arc which is greater than 8X degrees.

5. The hub claimed in claim 4 wherein each spoke bore pair is separated from an adjacent spoke bore pair by an arc which is greater than 2X degrees.

6. The hub claimed in claim 4 wherein each spoke bore pair is separated from an adjacent spoke bore pair by an arc which is greater than 4X degrees.

7. A hub for a rear tensioned spoked bicycle wheel having sixteen spokes or less, said hub comprising a proximate hub flange and an opposed hub flange, each of said flanges having at least six spoke bores extending therethrough, wherein the spoke bores in at least one of said flanges are grouped into at least three pairs, wherein each spoke bore in a given pair is spaced from the other spoke bore in said pair by an arc of X degrees or less and wherein each spoke bore pair is separated from an adjacent spoke bore pair by an arc which is greater than 8X degrees.

8. The hub claimed in claim 7 wherein each spoke bore pair is separated from an adjacent spoke bore pair by an arc which is greater than 2X degrees.

9. The hub claimed in claim 7 wherein each spoke bore pair is separated from an adjacent spoke bore pair by an arc which is greater than 4X degrees.

* * * * *